US006815852B2

(12) United States Patent
Horng et al.

(10) Patent No.: US 6,815,852 B2
(45) Date of Patent: Nov. 9, 2004

(54) ADJUSTING DEVICE FOR A DISK TRAY FOR AN OPTICAL DISK DRIVE MOTOR

(75) Inventors: Alex Horng, Kaohsiung (TW); Tso-Kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 91 days.

(21) Appl. No.: 10/309,257

(22) Filed: Dec. 4, 2002

(65) Prior Publication Data

US 2004/0108776 A1 Jun. 10, 2004

(51) Int. Cl.⁷ .......................... H02K 5/12; G11B 17/02; G11B 33/08
(52) U.S. Cl. .................... 310/67 R; 310/51; 360/99.07; 360/99.08
(58) Field of Search ............... 360/97–99.12; 310/51, 67 R

(56) References Cited

U.S. PATENT DOCUMENTS 5,499,777 A * 3/1996 Ahn .......................... 360/96.3
6,094,047 A * 7/2000 Guzik et al. ............. 360/98.01
6,158,112 A * 12/2000 Kim et al. ............... 360/99.08
6,462,902 B1 * 10/2002 Luo et al. ................ 360/99.12

* cited by examiner

Primary Examiner—Burton S. Mullins
Assistant Examiner—J. Aguirrechea
(74) Attorney, Agent, or Firm—Bacon & Thomas, PLLC

(57) ABSTRACT

An optical disk drive motor includes a rotor and a disk tray. At least one adjusting member is provided between the rotor and the disk tray. The adjusting member is adjustable to adjust a pressing force exerted on one of the rotor and the disk tray, thereby keeping the rotor and the disk tray in a parallel relationship.

4 Claims, 5 Drawing Sheets

ADJUSTING DEVICE FOR A DISK TRAY FOR AN OPTICAL DISK DRIVE MOTOR

BACKGROUND OF THE INVENTION

1. Field of the Invention

The present invention relates to an adjusting device for a disk tray for an optical disk drive motor.

2. Description of the Related Art

FIG. 1 of the drawings illustrates a conventional optical disk drive motor including a disk tray 10, a shaft 20, a rotor 30, and a stator 40. A holding means 11 is mounted on the disk tray 10 for holding an optical disk. The shaft 20 is connected to the disk tray 10 and the rotor 30. The stator 40 is fixed to an axle tube 41 and controlled by a circuit board 42 to create alternating magnetic fields for providing induction with a ring magnet 31 on the rotor 30, thereby turning the disk tray 10 and the optical disk.

Generally, the disk tray 10 would incline relative to the rotor 30 when the disk tray 10 is mounted onto the shaft 20. Namely, the disk tray 10 is apt to be located in a position not parallel to the rotor 30. To prevent unbalanced rotation of the optical disk drive motor and to decrease the bad product rate resulting from deviation of the disk tray 10, the disk tray 10 is subject to a grinding process to reduce the thickness of the disk tray 10 from "a" to "b", thereby keeping the surface of the disk tray 10 in a parallel relationship with the rotor 30. Though the grinding procedure could compensate the deviation of the disk tray 10, the balance state of the disk tray 10 must be repeatedly tested during the grinding procedure. As a result, the grinding procedure is considerably time-consuming. Further, the strength of the disk tray 10 and the rotational stability of the disk tray 10 could be destroyed by excessive grinding.

SUMMARY OF THE INVENTION

It is a primary object of the present invention to provide an adjusting device for a disk tray for an optical disk drive motor for adjusting the disk tray to a position parallel to a rotor of the optical disk drive motor.

An optical disk drive motor in accordance with the present invention comprises a rotor and a disk tray. At least one adjusting member is provided between the rotor and the disk tray. The adjusting member is adjustable to adjust a pressing force exerted on one of the rotor and the disk tray, thereby keeping the rotor and the disk tray in a parallel relationship.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 3:
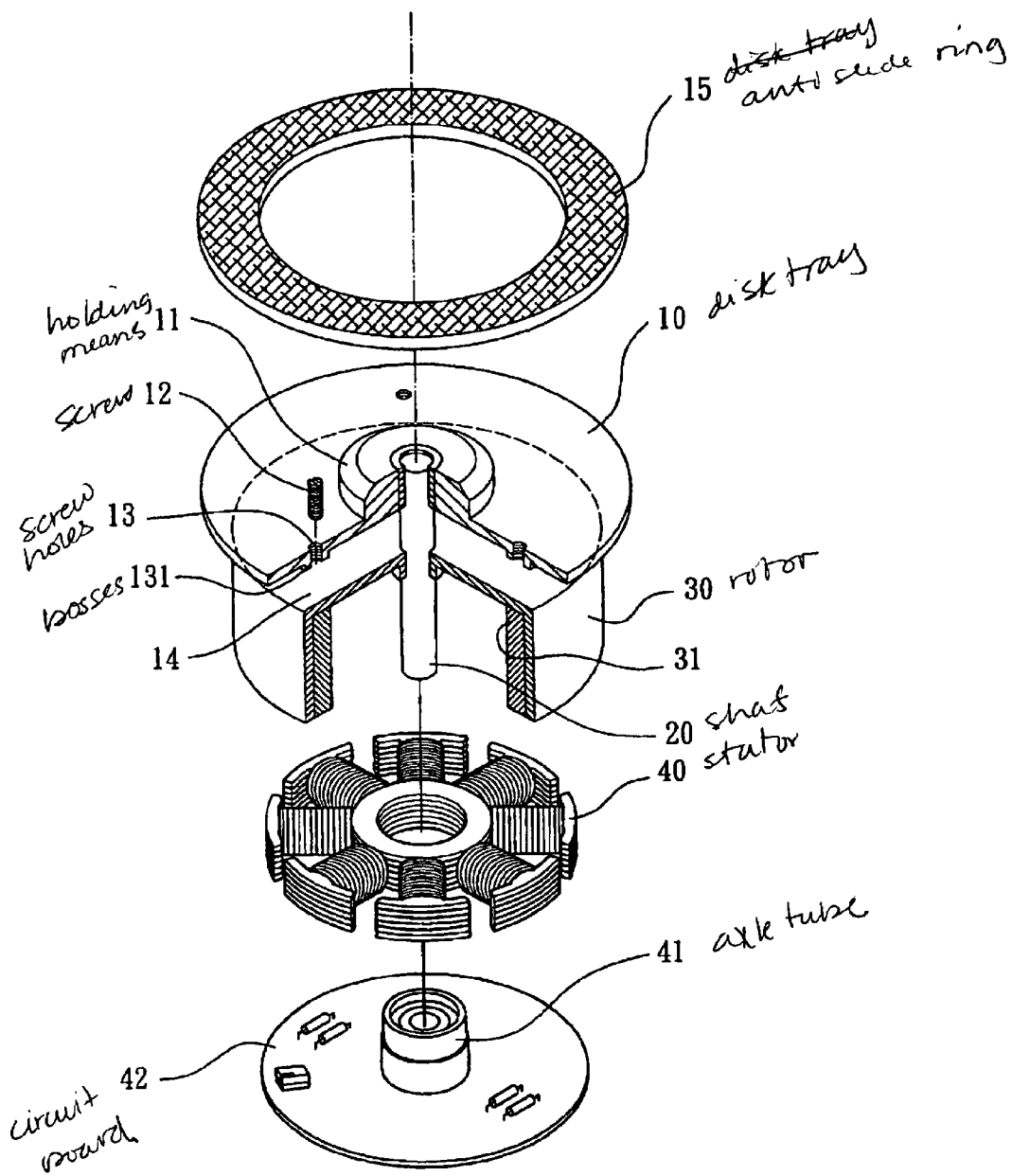
FIG. 3 is an exploded perspective view, partly cutaway, of an optical disk drive motor in accordance with the present invention.

Referring to FIG. 3, an optical disk drive motor in accordance with the present invention generally includes a circuit board 42 having an axle tube 41 formed thereon, a stator 40 mounted around the axle tube 41, and a rotor 30 mounted around the stator 40. The rotor 30 includes a shaft 20 rotatably held in the axle tube 41. Further, the rotor 30 includes a ring magnet 31 attached thereto for induction with the stator 40. A disk tray 10 is mounted above the rotor 30 and includes a hole (not labeled) through which the shaft 20 of the rotor 30 extends. A holding means 11 is mounted on an upper side of the disk tray 10 and securely engaged with an upper end of the shaft 20 of the rotor 30. An optical disk (not shown) placed on the disk tray 10 is held in place by the holding means 11. Thus, the optical disk and the holding means 11 are turned jointly by the shaft 20 of the rotor 30. An anti-slide ring 15 may be mounted on top of the disk tray 10 to prevent undesired sliding motion of the optical disk.

Figure 4:
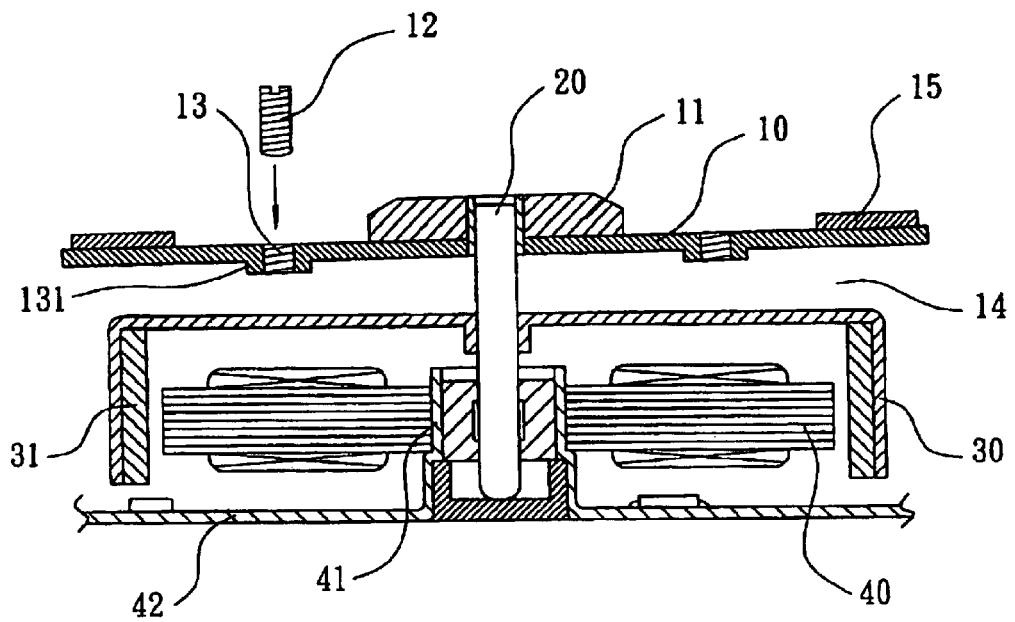
FIG. 4 is a sectional view of the optical disk drive motor in accordance with the present invention, illustrating adjustment of the position of the disk tray by an adjusting screw.
Figure 5:
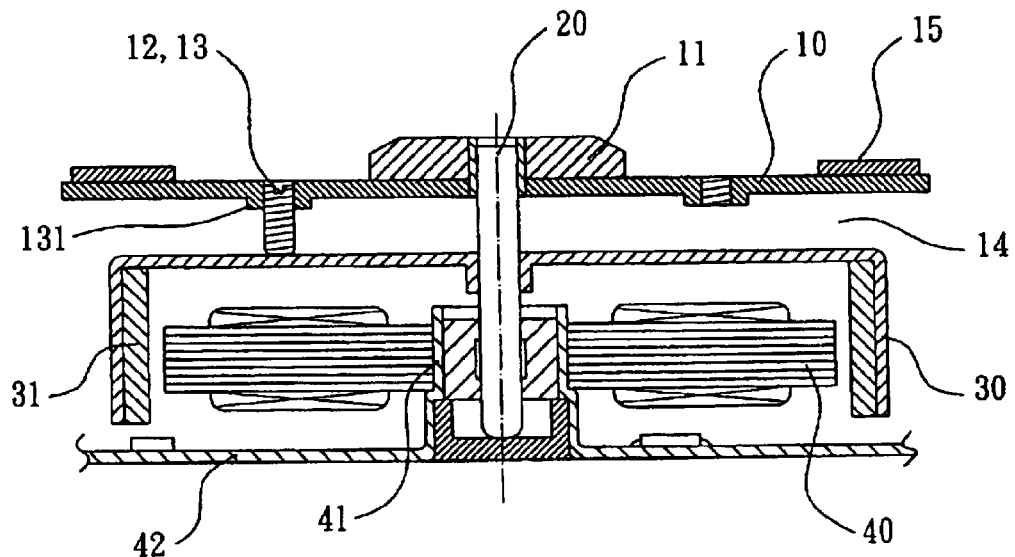
FIG. 5 is a sectional view of the optical disk drive motor in accordance with the present invention after adjustment.

Of more importance, the optical disk drive motor includes at least one adjusting member for adjusting the position of the disk tray 10 relative to the rotor 30. In this embodiment, the disk tray 10 includes a plurality of screw holes 13 spaced at regular angular intervals and extending in a direction transverse to a general plane on which the disk tray 10 lies. An adjusting screw 12 is extended through each screw hole 13. In use, the respective adjusting screw 12 is turned to adjust a width of a gap 14 defined between the disk tray 10 and the rotor 30, best shown in FIGS. 4 and 5. Thus, the relative position between the disk tray 10 and the rotor 30 is adjusted by means of turning the adjusting screws 12 until the disk tray 10 and the rotor 30 are parallel to each other. Thus, rotational balance of the rotor 30 is ensured. The deviation of the disk tray 10 relative to the rotor 30 can be easily compensated by means of turning one or more adjusting screws 12. After adjustment, the adjusting screws 12 can be fixed by means of welding, fusion, gluing, etc, dependent on the material (e.g., metal, alloy, plastic) of the adjusting screws 12. Loosening of the adjusting screws 12 and re-deviation of the disk tray 10 are avoided. A plurality of bosses 131 are formed on an underside of the disk tray 10. Each boss 131 is located below an associated screw hole 13 and has a hole (not labeled) aligned with the associated screw hole 13, thereby strengthening the structure of the disk tray 20.

Figure 6:
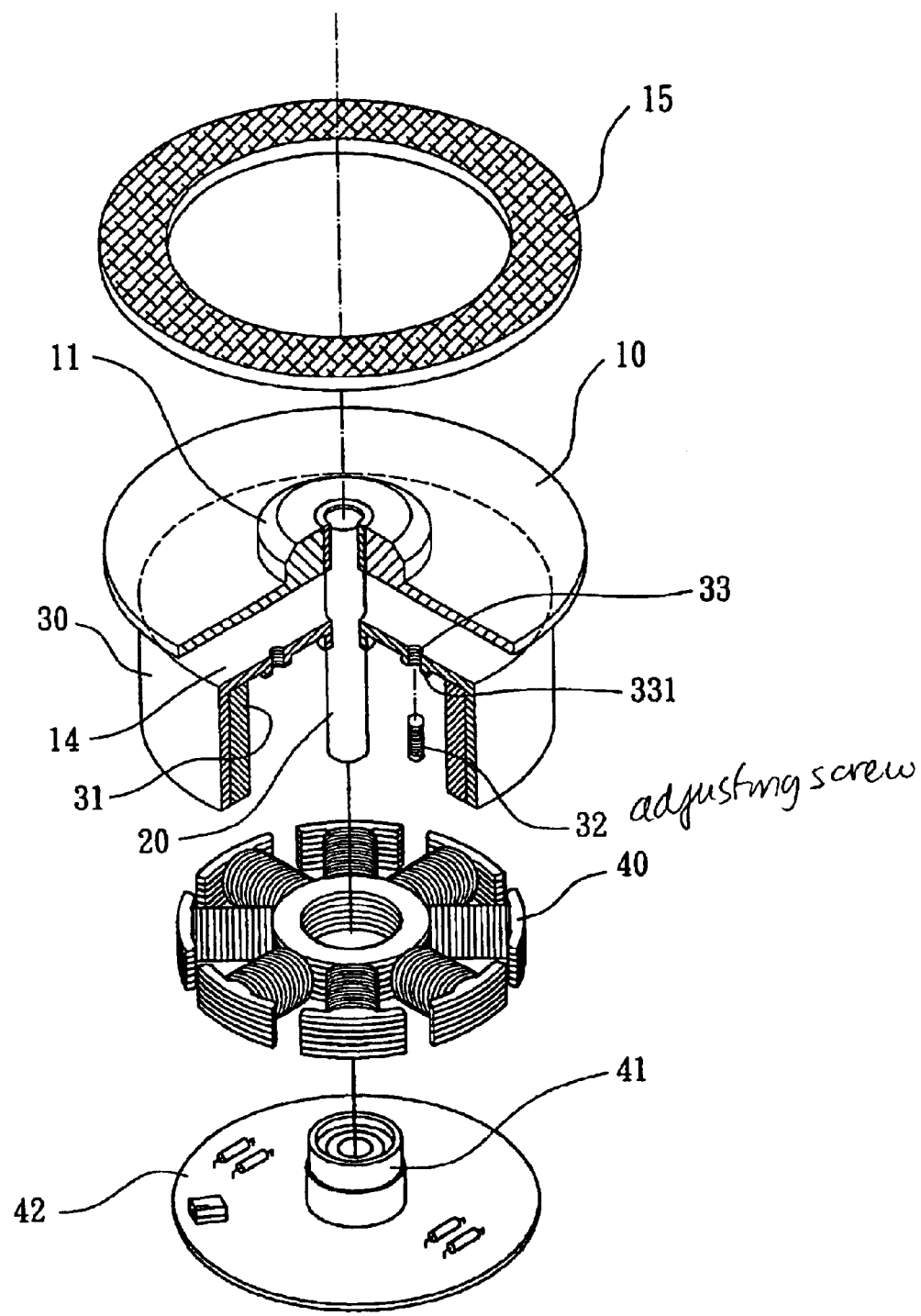
FIG. 6 is an exploded perspective view, partly cutaway, of a modified embodiment of the optical disk drive motor in accordance with the present invention.
Figure 7:
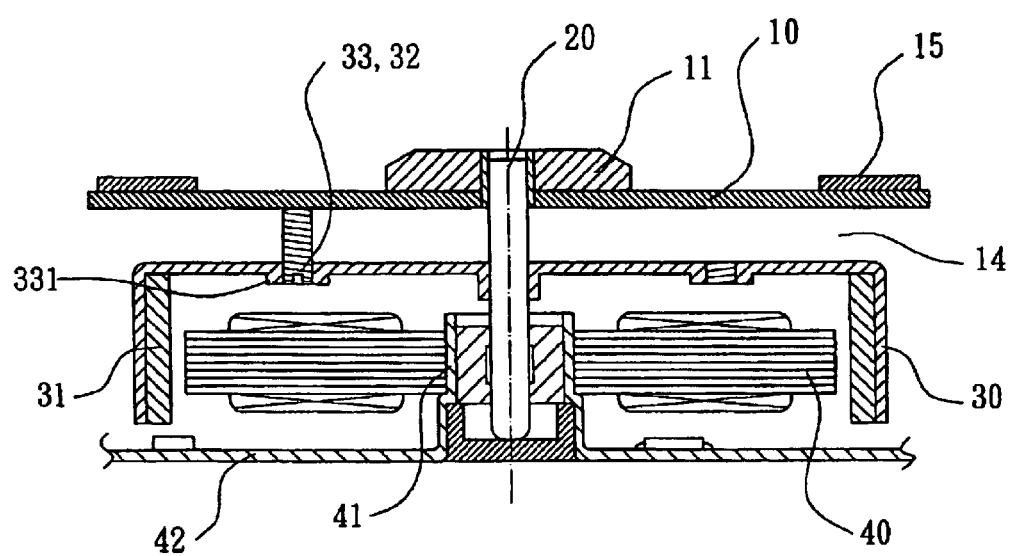
FIG. 7 is a sectional view of the optical disk drive motor in FIG. 6.

FIGS. 6 and 7 illustrate a modified embodiment of the invention, wherein the rotor 30 includes a plurality of screw holes 33 spaced at regular angular intervals. An adjusting screw 32 is extended through each screw hole 33. In use, the respective adjusting screw 32 is turned to adjust the pressing force exerted by a distal end of the respective adjusting screw 32 against the disk tray 10, best shown in FIG. 7. Thus, the relative position between the disk tray 10 and the rotor 30 is adjusted by means of turning the adjusting screws 32 until the disk tray 10 and the rotor 30 are parallel to each other. Thus, rotational balance of the rotor 30 is ensured. The deviation of the disk tray 10 relative to the rotor 30 can be easily compensated by means of turning one or more adjusting screws 32. A plurality of bosses 331 are formed on an underside of the rotor 30. Each boss 331 is located below an associated screw hole 33 and has a hole (not labeled) aligned with the associated screw hole 33, thereby strengthening the structure of the rotor 30.

It is appreciated that the adjusting screws 12, 32 and the screw holes 13, 33 can be replaced with other adjusting means without departing from the scope of the invention. Examples of the adjusting means include columns of different lengths, several elastic elements of different elastic coefficients, etc.

Figure 1:
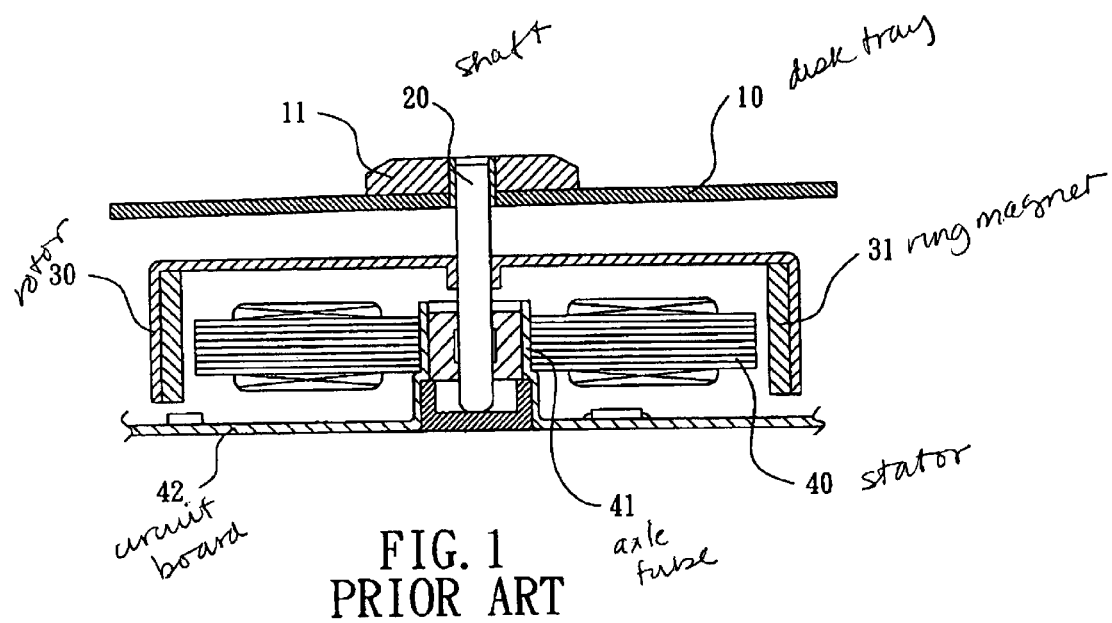
FIG. 1 is a sectional view of a conventional optical disk drive motor.
Figure 2:
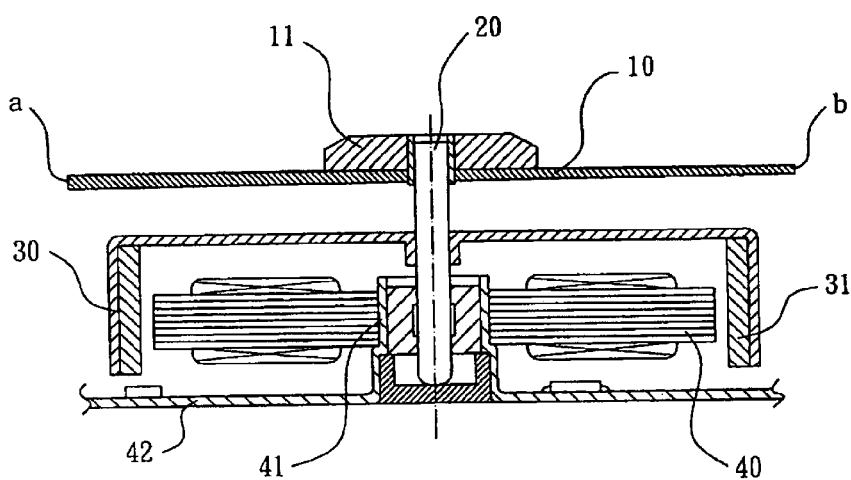
FIG. 2 is a sectional view similar to FIG. 1, illustrating compensation of deviation of a disk tray.

Compare FIG. 1 with FIG. 3, by means of providing the adjusting members (adjusting screws 12, 32) and the screw holes 13, 33 to adjust the pressing forces provided by the adjusting members, the disk tray 1 and the rotor 30 can be parallel each other to compensate the deviation of the disk tray 10 relative to the rotor 30. The damage of the disk tray 10 resulting from excessive grinding and time-consuming processing of the disk tray 10 in the prior art are avoided. Conclusively, the disk tray 10 and the rotor 30 of the optical disk drive motor in accordance with the present invention are kept in parallel relationship with each other under non-destructive means. The adjusting procedure is simple and easy and can be accomplished in a relatively short time.

Although the invention has been explained in relation to its preferred embodiments as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. An optical disk drive motor comprising:

a rotor, a disk tray, an anti-slide ring, said anti-slide ring is attached to an upper surface of said disk tray to define a height above said disk tray, at least one adjusting screw provided between the rotor and a screw hole of the disk tray, said adjusting screw has a distal end lower than said height of said anti-slide ring to avoid protruding on a top common plane of said anti-slide ring, and said adjusting screw being adjustable to adjust a width of a gap between the rotor and the disk tray, thereby keeping the rotor and the disk tray in a parallel relationship.

2. The optical disk drive motor as claimed in claim 1, wherein said at least one adjusting screw is fixed permanently in position when the rotor and the disk tray are parallel to each other.

3. The optical disk drive motor as claimed in claim 1, wherein the disk tray further comprises at least one boss on an underside thereof, said at least one boss being located below said at least one screw hole.

4. The optical disk drive motor as claimed in claim 1, wherein said anti-slide ring is attached to said upper surface of said disk tray to define a space in which to accomodate said distal end of said adjusting screw to avoid protruding on the top common plane of said anti-slide ring.

* * * * *